United States Patent
Kao et al.

(10) Patent No.: US 9,204,043 B2
(45) Date of Patent: Dec. 1, 2015

(54) IMAGE SENSING MODULE AND OPTICAL SIGNAL PROCESSING DEVICE

(75) Inventors: Ming-Tsan Kao, Hsin-Chu (TW);
Jian-Lung Tzeng, Hsin-Chu (TW);
Hsin-Chi Cheng, Hsin-Chu (TW);
Teng-Wei Hsu, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 998 days.

(21) Appl. No.: 13/297,269

(22) Filed: Nov. 16, 2011

(65) Prior Publication Data

US 2012/0120247 A1    May 17, 2012

(30) Foreign Application Priority Data

Nov. 16, 2010   (TW) .............................. 099139343 A (51) Int. Cl.
| | |
|---|---|
| H04N 5/225 | (2006.01) |
| H04N 5/228 | (2006.01) |
| H04N 5/232 | (2006.01) |
| G06F 1/32 | (2006.01) |
| G06F 3/041 | (2006.01) |
| G06F 3/042 | (2006.01) |

(52) U.S. Cl.
CPC .......... *H04N 5/23241* (2013.01); *G06F 1/3206* (2013.01); *G06F 1/3231* (2013.01); *G06F 1/3262* (2013.01); *G06F 1/3265* (2013.01); *G06F 3/042* (2013.01); *G06F 3/0416* (2013.01); *H04N 5/23245* (2013.01); *Y02B 60/1242* (2013.01); *Y02B 60/1289* (2013.01)

(58) Field of Classification Search
CPC .......... H04N 5/23241; H04N 5/23245; G06F 1/3206; G06F 1/3231; G06F 1/3262; G06F 1/3665; G06F 3/0416; G06F 3/042; Y02B 60/1242; Y02B 60/1289
See application file for complete search history.

(56) References Cited

U.S. PATENT DOCUMENTS

| | | | |
|---|---|---|---|
| 2004/0208347 A1* | 10/2004 | Baharav et al. ................ | 382/124 |
| 2006/0093191 A1* | 5/2006 | Neil et al. ..................... | 382/124 |
| 2008/0002034 A1 | 1/2008 | Tsai | |
| 2009/0123029 A1 | 5/2009 | Harada | |
| 2009/0204831 A1* | 8/2009 | Cousson et al. .............. | 713/322 |
| 2010/0245605 A1* | 9/2010 | Sakurai .................... | 348/208.99 |
| 2011/0043483 A1 | 2/2011 | Mizuhashi | |

FOREIGN PATENT DOCUMENTS

| | | |
|---|---|---|
| CN | 1668081 A | 9/2005 |
| TW | 200925706 | 6/2009 |
| TW | 201037648 | 10/2010 |

* cited by examiner

*Primary Examiner* — Joseph Ustaris
*Assistant Examiner* — Jill Sechser
(74) *Attorney, Agent, or Firm* — Winston Hsu; Scott Margo (57) ABSTRACT

An image sensing module includes an image sensor and a sensing controller. The image sensor captures an image with a first frequency. The sensing controller determines whether the image sensor has detected an object according to the image. When the sensing controller determines that the image sensor has detected an object, the sensing controller switches the image sensor to capture the image with a second frequency for the image sensor to continuously detect the location of the object. By setting the first frequency higher than the second frequency, the image-sensing module detects the object in real time and the power consumption of the image-sensing module continuously detecting the location of the object is saved as well.

22 Claims, 12 Drawing Sheets

IMAGE SENSING MODULE AND OPTICAL SIGNAL PROCESSING DEVICE

CROSS-REFERENCE TO RELATED APPLICATIONS

This application claims the benefit of Taiwan Patent Application No. 099139343 filed Nov. 16, 2010, now Taiwan Patent No. 1464691, and incorporated herein by reference in its entirety.

BACKGROUND OF THE INVENTION

1. Field of the Invention

The present invention relates to image sensing modules, and particularly to an image sensing module capable of actively switching sense image capture frequency.

2. Description of the Prior Art

Generally speaking, image sensors are utilized for sensing light to generate sense images. Image sensors can be applied to many fields, including optical touch devices, optical distance measurement devices, or optical image capture devices. An optical touch device can determine whether or not the image sensor senses an object (such as a user's finger) according to sense images generated by the image sensor. When the image sensor captures sense images at a relatively high frequency, the optical touch device may more rapidly determine whether or not the image sensor senses the object. Thus, the image sensor uses a relatively higher frequency to capture the sense images to allow the optical touch device to respond rapidly to user controls, so as to provide real time detection of objects (such as user fingers).

In the prior art, the image sensor always operates at the same frequency, regardless of whether or not an object is detected. In other words, even if the image sensor has detected an object, the image sensor will continue to capture images at the same high frequency to keep detecting the object's position. However, the object detected by the image sensor typically does not move rapidly. For example, when a user operates an optical touch device, his/her fingers do not move quickly. In other words, the image sensor could actually use a low frequency to capture images, and would still be able to detect the object's position. Thus, the prior art image sensor wastes power by capturing images at the high frequency after detecting the object.

SUMMARY OF THE INVENTION

According to an embodiment, an image sensing module comprises a first image sensor having a first scanning mode and a second scanning mode. When the first image sensor operates in the first scanning mode, the first image sensor uses a first frequency to capture a first sense image. When the first image sensor operates in the second scanning mode, the first image sensor uses a second frequency to capture the first sense image. The image sensing module further comprises a first sensing controller for determining whether the first image sensor detects an object according to the first sense image. When the first image sensor operates in the first scanning mode and the first sensing controller determines that the first image sensor has detected an object, the first sensing controller controls the first image sensor to switch over to operate in the second scanning mode.

According to an embodiment, an optical signal processing device comprises a first image sensing module and a controller. The first image sensing module comprises a first image sensor for sensing light to generate a first sense image, and a first sensing controller for receiving the first sense image and generating first image data. The controller is for generating output data according to the first image data to provide to a host. The host requests the output data from the controller every output data request period. The controller generates an adjustment signal according to timing of the host requesting the output data from the controller. The first sensing controller receives the adjustment signal to adjust timing of the first sensing controller generating the first image data.

According to an embodiment, an optical signal processing device, comprises a first image sensing module comprising a first image sensor for sensing light to generate a first sense image, and a first sensing controller for receiving the first sense image and generating first image data. The optical signal processing device further comprises a controller. The controller requests the first image data from the first sensing controller every image data request period, and the controller generates output data according to the first image data to provide to a host. The host requests the output data from the controller every output data request period. The first sensing controller adjusts timing of the first sensing controller generating the first image data according to timing of the controller requesting the first image data from the first sensing controller.

According to an embodiment, an optical signal processing device comprises a first image sensing module comprising a first image sensor for sensing light to generate generates a first sense image, and a first sensing controller for receiving the first sense image and generating first image data. The optical signal processing device further comprises a controller. The controller requests the first image data from the first sensing controller every image data request period, and generates output data according to the first image data to provide to a host. The host requests the output data from the controller every output data request period. The controller adjusts timing of the controller requesting the first image data from the first sensing controller according to timing of the host requesting the output data from the controller.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
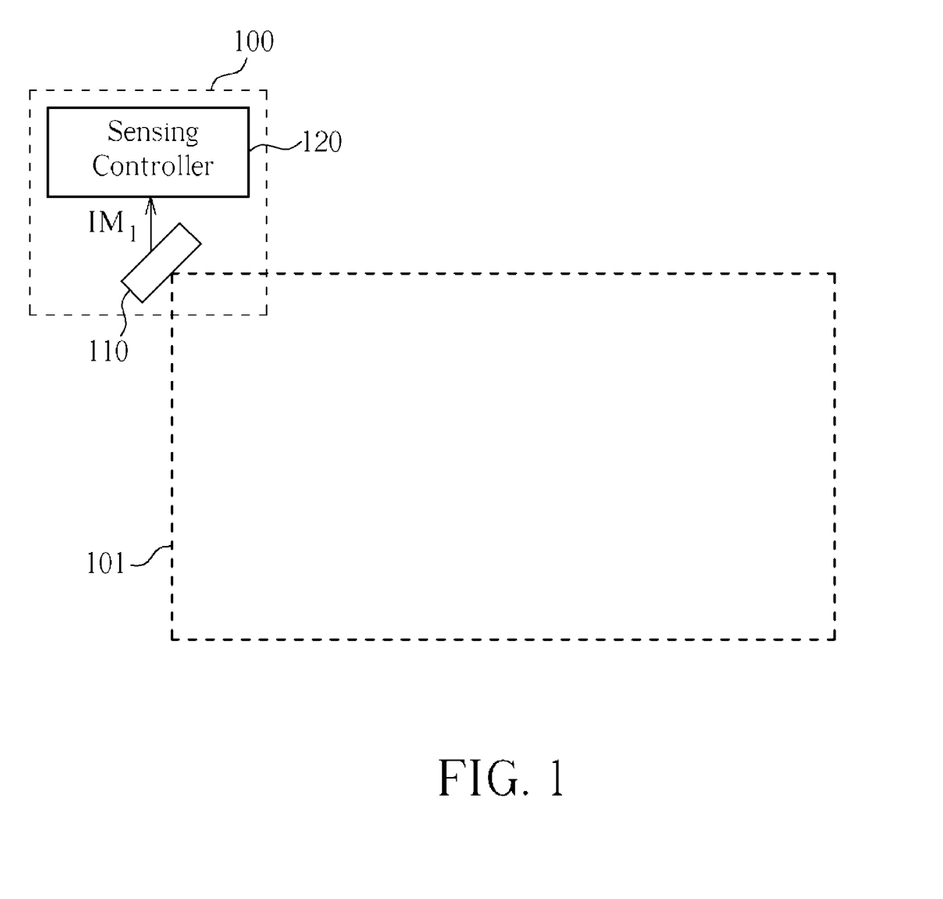
FIG. 1 and FIG. 2 are diagrams of image sensing module according to an embodiment.
Figure 2:
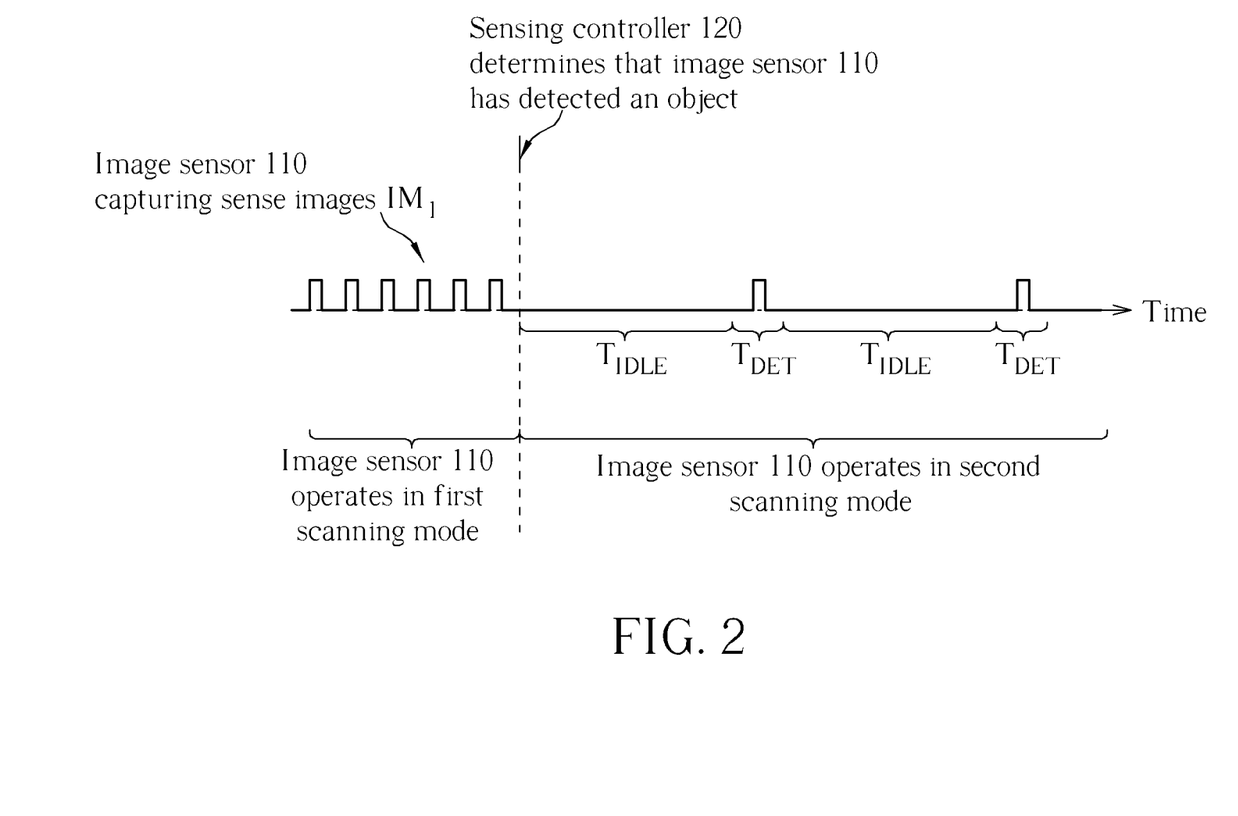

Please refer to FIG. 1 and FIG. 2. FIG. 1 and FIG. 2 are diagrams of image sensing module 100 according to an embodiment. In FIG. 1, it is assumed that image sensing module 100 is used in an optical touch device, and the optical touch device uses image sensing module 100 to detect an object in region 101 for performing touch control. Image sensing module 100 comprises image sensor 110 and sensing controller 120. As shown in FIG. 2, image sensor 110 is used for sensing light to generate sense image $IM_1$. Image sensor 110 has a first scanning mode and a second scanning mode to allow image sensor 110 to detect objects in real time, and simultaneously conserve electrical power when image sensor 110 continues detecting the object after detecting the object. When image sensor 110 has not detected the object, image sensor 110 operates in the first scanning mode. At this time, image sensor 110 captures sense image IM1 at a relatively higher first frequency, so that image sensing module 100 can detect the object in real time. After image sensor 110 detects the object, image sensor 110 operates in the second scanning mode. At this time, image sensor 110 captures sense image IM1 at a relatively lower second frequency so as to save power as image sensor 110 continually detects the object's position. In addition, operation of image sensor 110 in the second scanning mode may be split into an idle period $T_{IDLE}$, and a detection period $T_{DET}$. During idle period $T_{IDLE}$, image sensor 110 does not capture sense images $IM_1$. At this time, image sensor 110 may enter a sleep state to save power. During detection period $T_{DET}$, image sensor 110 captures sense image $IM_1$. Sensing controller 120 determines whether image sensor 110 has detected an object according to sense image $IM_1$. When image sensor 110 has not yet detected an object, sensing controller 120 controls image sensor 110 to operate in the first scanning mode, so that image sensor 110 may detect objects in real time, so that the optical touch device may rapidly respond to user control. When image sensor 110 operates in the first scanning mode and sensing controller 120 determines image sensor 110 has detected an object, sensing controller 120 controls image sensor 110 to switch over to operate in the second scanning mode so that, relative to the image sensor of the prior art, the image sensor 110 of the image sensing module 100 can capture sense image IM1 at a relatively lower frequency after detecting the object, and thereby may save power consumed when image sensor 110 continues to detect the object's position.

Figure 3:
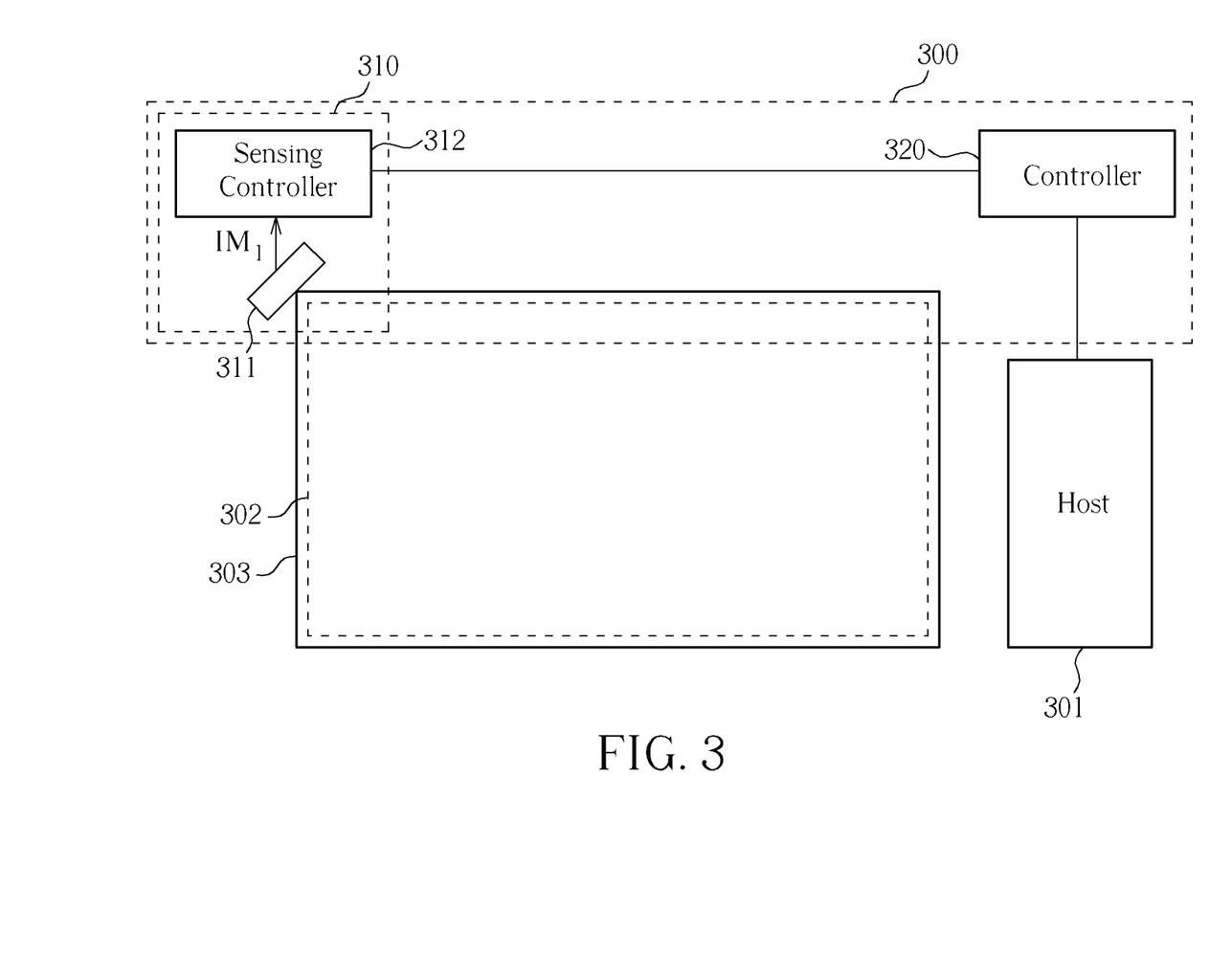
FIG. 3 is a diagram of an optical signal processing device according to an embodiment.

Please refer to FIG. 3, which is a diagram of an optical signal processing device 300 according to an embodiment. Optical signal processing device 300 may be used as an optical touch device, an optical distance measuring device, and/or an optical image capture device. Optical signal processing device 300 comprises image sensing module 310 and controller 320. Image sensing module 310 comprises image sensor 311 and sensing controller 312. Image sensor 311 senses light to generate sense image $IM_1$. Sensing controller 312 may determine whether image sensor 311 has detected an object according to sense image $IM_1$. Additionally, sensing controller 312 may use the method shown in FIG. 2 to control image sensor 311 to operate in the first scanning mode or the second scanning mode. Controller 320 is coupled to host 301 and sensing controller 312. Sensing controller 312 notifies controller 320 whether image sensor 311 has detected an object. For example, sensing controller 312 may output an interrupt signal to controller 320 to notify controller 320 that image sensor 311 has detected an object. Or, sensing controller 312 generates a detection result according to whether image sensor 311 has detected an object, and controller 320 requests the detection result every detection result request period. Controller 320 also notifies host 301 whether image sensor 311 has detected an object. For example, controller 320 may output an interrupt signal to host 301 to notify host 301 that image sensor 311 has detected an object. Or, controller 320 generates a detection result according to whether image sensor 311 has detected an object, and host 301 requests the detection result every detection result request period. Host 301 may respond to detection of an object (or lack thereof) by image sensor 311. For example, assume optical signal processing device 300 is an optical touch device, image sensing module 310 senses objects in region 302, and host 301 is a personal computer or on-screen display (OSD) controller for controlling display of images in a display 303 under region 302. When controller 320 notifies host 301 that image sensor 311 has not yet detected an object, e.g. user's finger, host 301 controls display 303 not to display images, so as to save power. When controller 320 notifies host 301 that image sensor 311 has detected an object, e.g. user's finger, host 301 controls display 303 to display images to aid the user in performing touch control.

Figure 4:
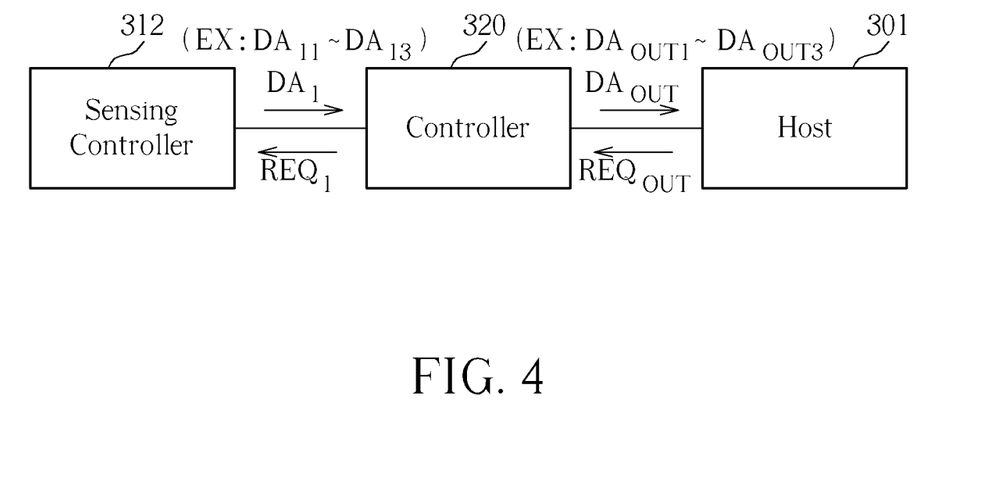
FIG. 4 and FIG. 5 are diagrams illustrating data transfer between sensing controller, controller and host.
Figure 5:
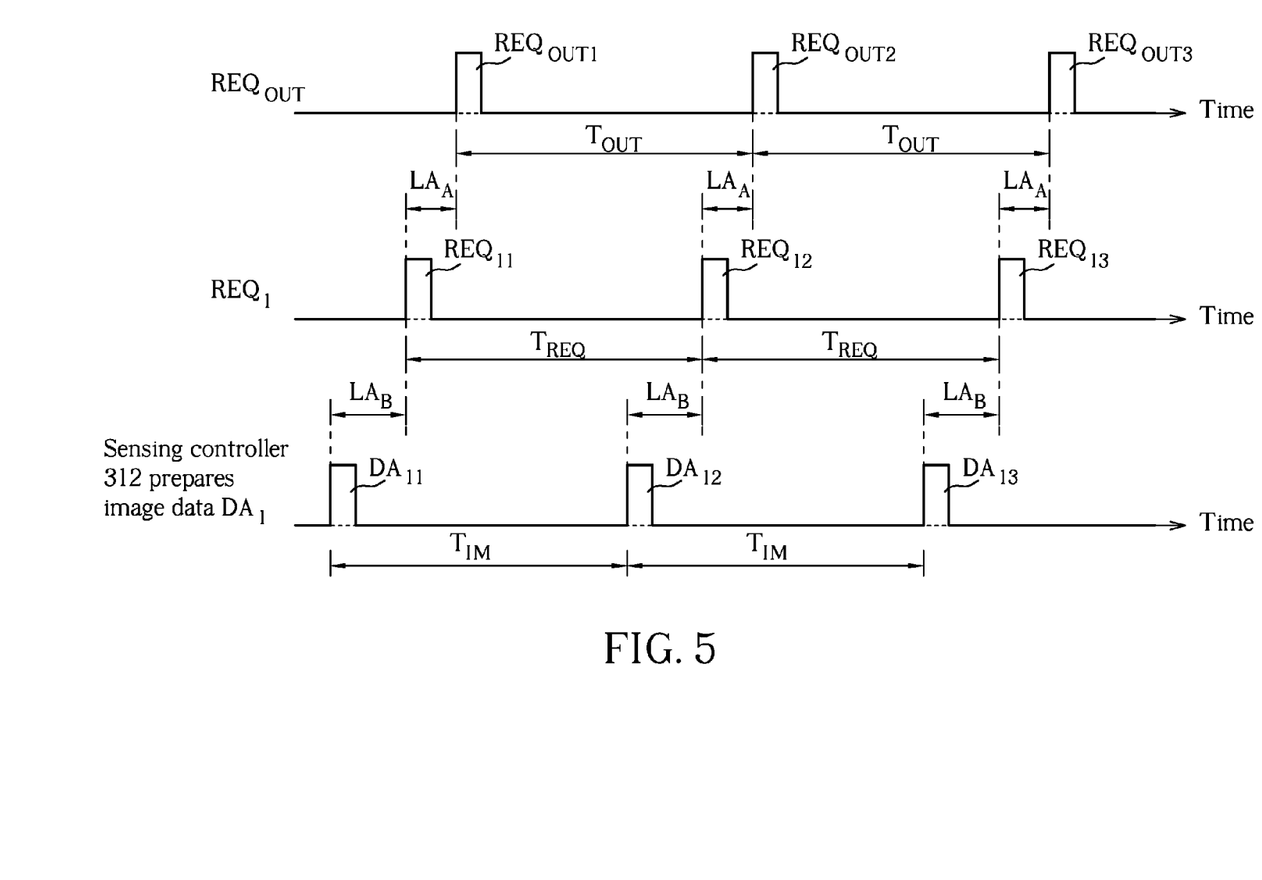
Figure 6:
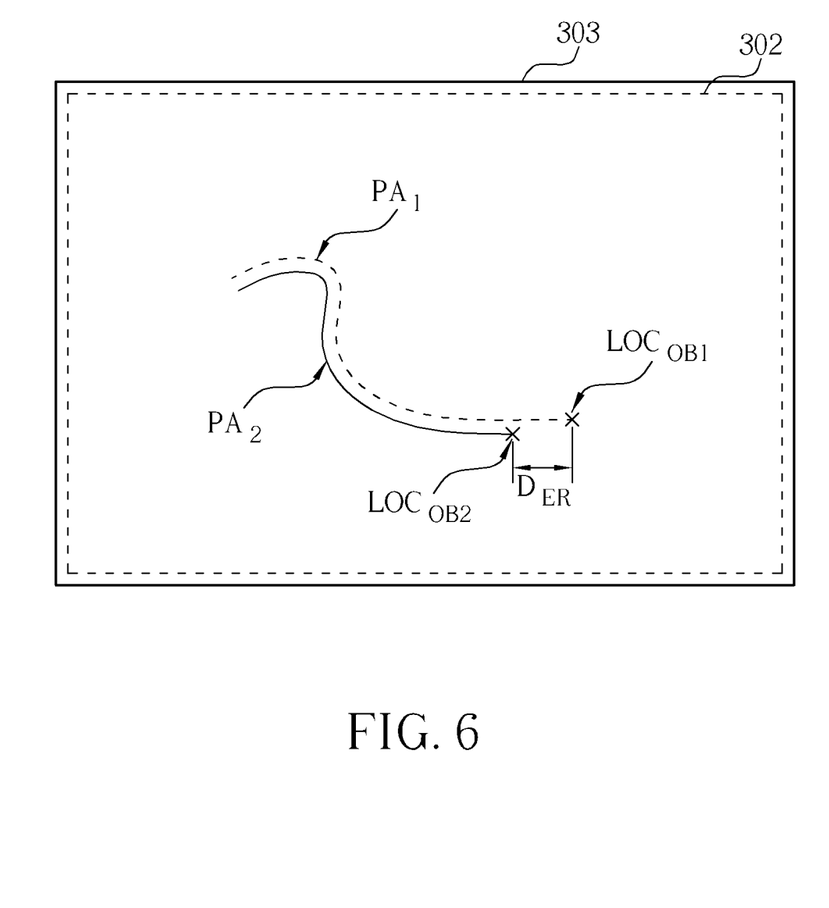
FIG. 6 illustrates user's finger moving rapidly along one path, while host controls display to display another path traced by user's finger according to received output data.

Please refer to FIG. 4 and FIG. 5, which are diagrams illustrating data transfer between sensing controller 312, controller 320 and host 301. When image sensor 311 has detected an object, e.g. when image sensor 311 operates in the second scanning mode described in FIG. 2, sensing controller 312 receives sense image $IM_1$ and generates image data $DA_1$, where image data $DA_1$ comprises at least one object, e.g. one or more user fingers, in image data of sense image $IM_1$. In FIG. 5, it is assumed that sensing controller 312 generates image data $DA_1$ every image data generation period $T_{IM}$. Controller 320 sends out image data request $REQ_1$ every image data request period $T_{REQ}$ to request image data $DA_1$ from sensing controller 312, and controller 320 may obtain position of the object, e.g. user finger(s), according to image data $DA_1$, and generate output data $DA_{OUT}$ comprising coordinates information of the object, e.g. user's finger(s), based thereupon. For example, as shown in FIG. 5, controller 320 sends out image data request $REQ_{11}$ for receiving image data $DA_{11}$ from sensing controller 312, and at this time, controller 320 generates output data $DA_{OUT1}$ according to image data $DA_{11}$. After one image data request period $T_{REQ}$, controller 320 sends out image data request $REQ_{12}$ to receive image data $DA_{12}$ from sensing controller 312, and at this time, controller 320 generates output data $DA_{OUT2}$ according to image data $DA_{12}$. After a further one image data request period $T_{REQ}$, controller 320 sends out image data request $REQ_{13}$ to receive image data $DA_{13}$ from sensing controller 312, and at this time, controller 320 generates output data $DA_{OUT3}$ according to image data $DA_{12}$. Host 301 sends out output data request $REQ_{OUT}$ every one output data request period $T_{OUT}$ to request output data $DA_{OUT}$ from controller 320. For example, as shown in FIG. 5, host 301 sends out output data request $REQ_{OUT1}$ to receive output data $DA_{OUT1}$ from controller 320. One output data request period $T_{OUT}$ later, host 301 sends out output data request $REQ_{OUT2}$ to receive output data $DA_{OUT2}$ from controller 320. One further output data request period $T_{OUT}$ later, host 301 sends out output data request $REQ_{OUT3}$ to receive output data $DA_{OUT3}$ from controller 320. However, it can be seen from FIG. 5 that, from the time sensing controller 312 has readied image data $DA_1$, e.g. $DA_{11}$ to $DA_{13}$, to the time controller 320 receives image data $DA_1$, a delay period $LA_B$ has already passed, and from the time controller 320 receives image data $DA_1$ to the time host 301 receives output data $DA_{OUT}$, e.g. $DA_{OUT1}$ to $DA_{OUT3}$, a delay period $LA_A$ has already passed. In other words, from the time sensing controller 312 has readied image data $DA_1$ to the time host 301 receives output data $DA_{OUT}$, e.g. $DA_{OUT1}$ to $DA_{OUT3}$, a delay period ($LA_A+LA_B$) has already passed. This means that coordinates information about the object received by host 301 according to output data $DA_{OUT}$ is not real time. For example, as shown in FIG. 6, assume user's finger moves rapidly along path $PA_1$ (dashed line) in region 302, and host 301 controls display 303 to display path $PA_2$ traced by user's finger according to received output data $DA_{OUT}$. Because coordinates information about the object received by host 301 according to output data $DA_{OUT}$ is not real time, although user's finger may already have moved to location $LOC_{OB1}$, display 303 displays user's finger as being located at position $LOC_{OB2}$. This means that the delay period ($LA_A+LA_B$) described above causes an error $D_{ER}$ between the actual location $LOC_{OB1}$ of the user's finger and the location of the user's finger displayed by display 303. As delay periods $LA_A$, $LA_B$ increase, error $D_{ER}$ also increases. Thus, it can be seen from the above description that delay periods $LA_A$, $LA_B$ cause host 301 to be unable to obtain real time output data $DA_{OUT}$, which slows down response speed of host 301.

Figure 7:
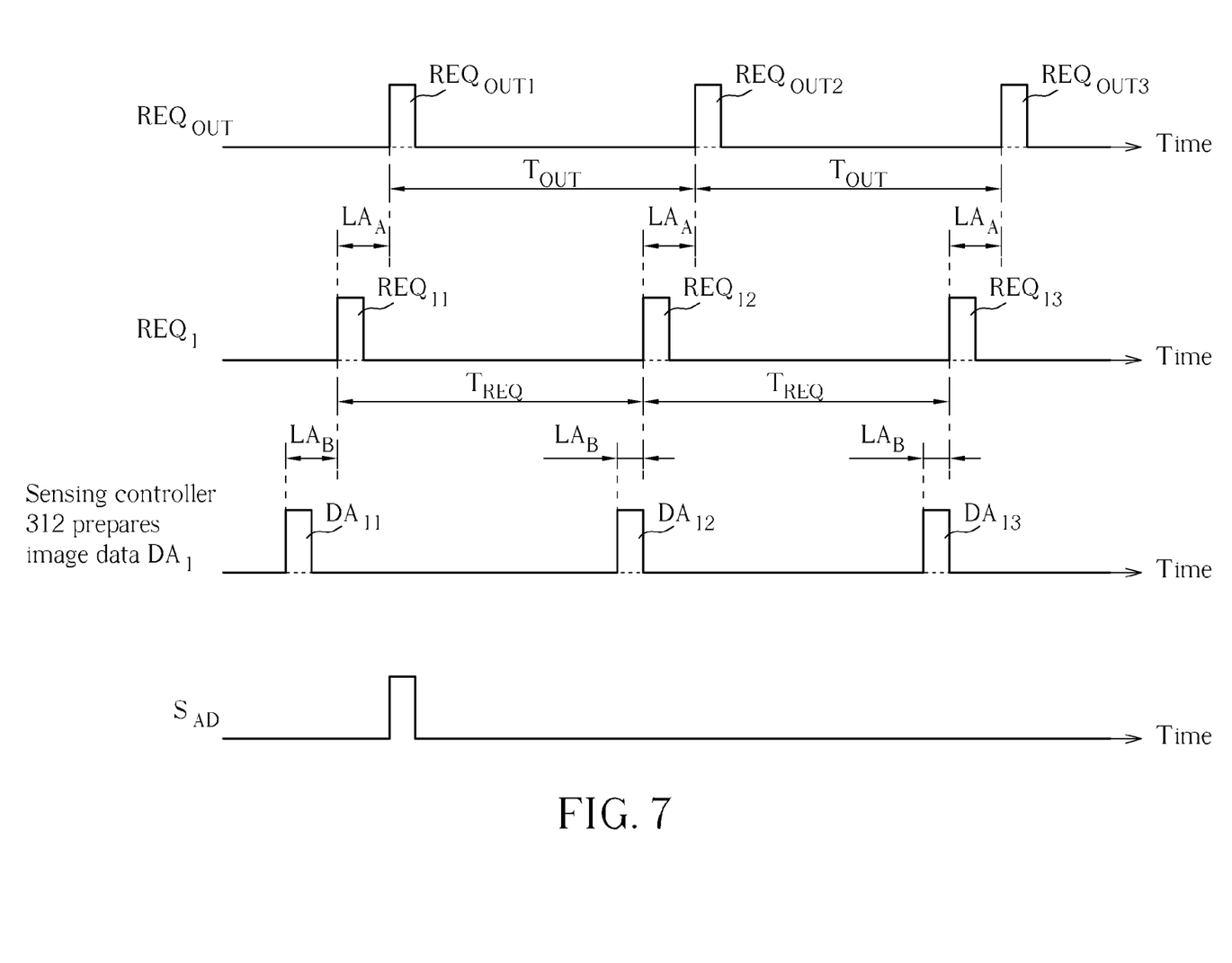
FIG. 7 is a diagram illustrating a method of reducing delay period according to an embodiment.

Please refer to FIG. 7, which is a diagram illustrating a method of reducing delay period $LA_B$ according to an embodiment. In order to reduce delay period $LA_B$, controller 320 may generate an adjustment signal $S_{AD}$ according to when host 301 requests output data $D_{OUT}$ from controller 320. When sensing controller 312 receives adjustment signal $S_{AD}$, timing of sensing controller 312 generating image data $DA_1$ may be adjusted. For example, in FIG. 7, after controller 320 sends out image data request $REQ_{11}$, adjustment signal $S_{AD}$ is generated, and adjustment signal $S_{AD}$ may be used for indicating to controller 320 timing for sending out image data request $REQ_1$, and length of image data request period $T_{REQ}$. Thus, sensing controller 312 can adjust timing of generating image data $DA_1$ according to timing of controller 320 sending out image data request $REQ_1$ and length of image data request period $T_{REQ}$. As shown in FIG. 7, timing of sensing controller 312 generating image data $DA_{12}$ can be coordinated with timing of controller 320 sending out image data request $REQ_{12}$, and timing of sensing controller 312 generating image data $DA_{13}$ can be coordinated with timing of controller 320 sending out image data request $REQ_{13}$. In this way, delay period $LA_B$ may be reduced, and host 301 may obtain closer to real time output data $DA_{OUT}$.

Figure 8:
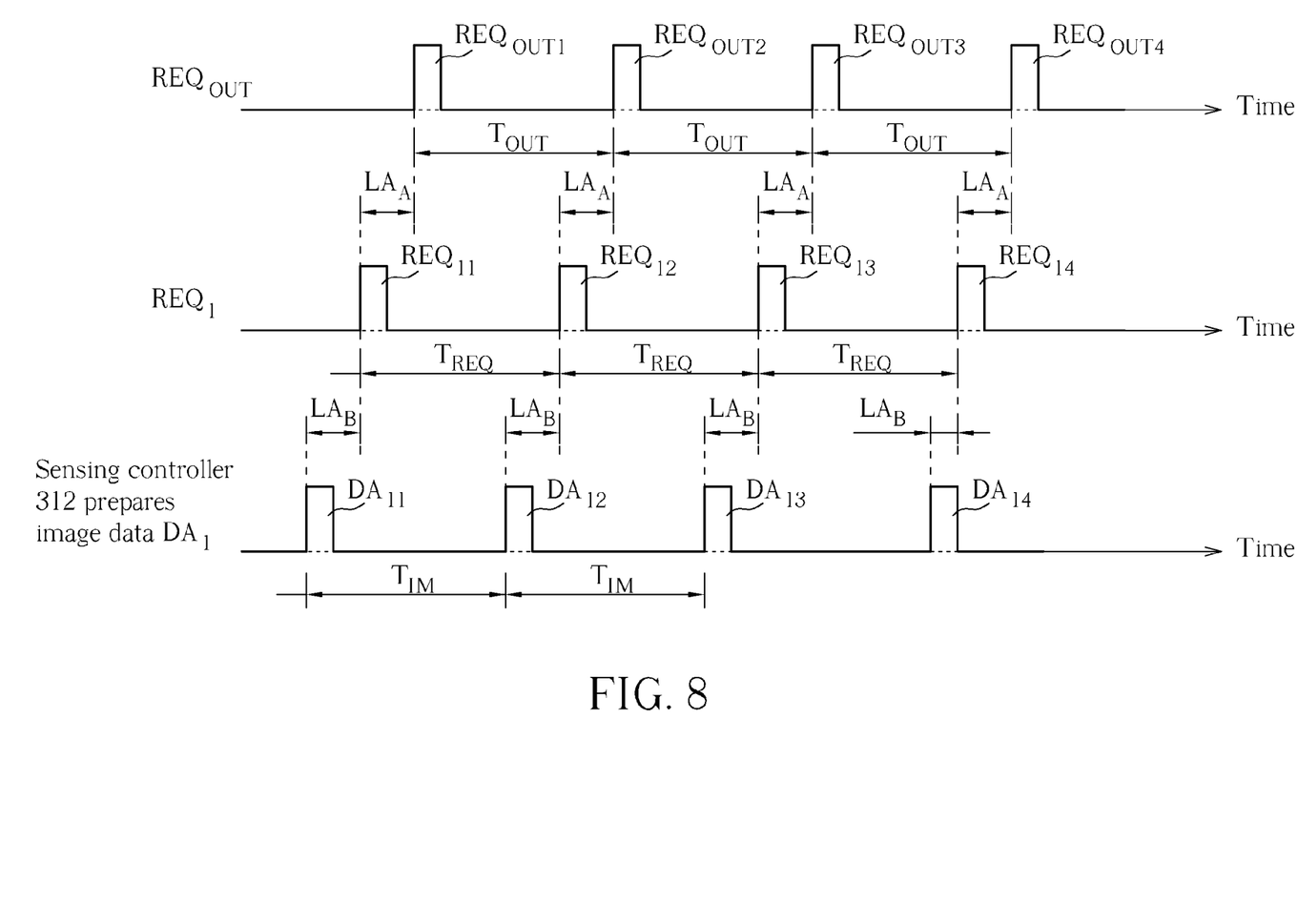
FIG. 8 is a diagram illustrating another method for reducing delay period.

Please refer to FIG. 8, which is a diagram illustrating another method for reducing delay period $LA_B$. To reduce delay period $LA_B$, sensing controller 312 may actively adjust timing of sensing controller 312 generating image data $DA_1$ according to timing of controller 320 requesting image data $DA_1$ of sensing controller 312. For example, in FIG. 8, after sensing controller 312 receives image data requests $REQ_{11}$, $REQ_{12}$ and $REQ_{13}$, sensing controller 312 may calculate length of image data request period $T_{REQ}$ according to time lapsed between controller 320 sending out image data requests $REQ_{11}$ and $REQ_{12}$, and time lapsed between controller 320 sending out image data requests $REQ_{12}$ and $REQ_{13}$, and may calculate timing for controller 320 to send out a future image data request, e.g. $REQ_{14}$, according to length of image data request period $T_{REQ}$ and timing of controller 320 sending out image data request $REQ_{13}$. In this way, sensing controller 312 may adjust timing of sensing controller 312 generating image data $DA_1$ according to calculated timing of controller 320 sending out image data request $REQ_1$, so that host 301 obtains closer to real time output data $DA_{OUT}$.

Figure 9:
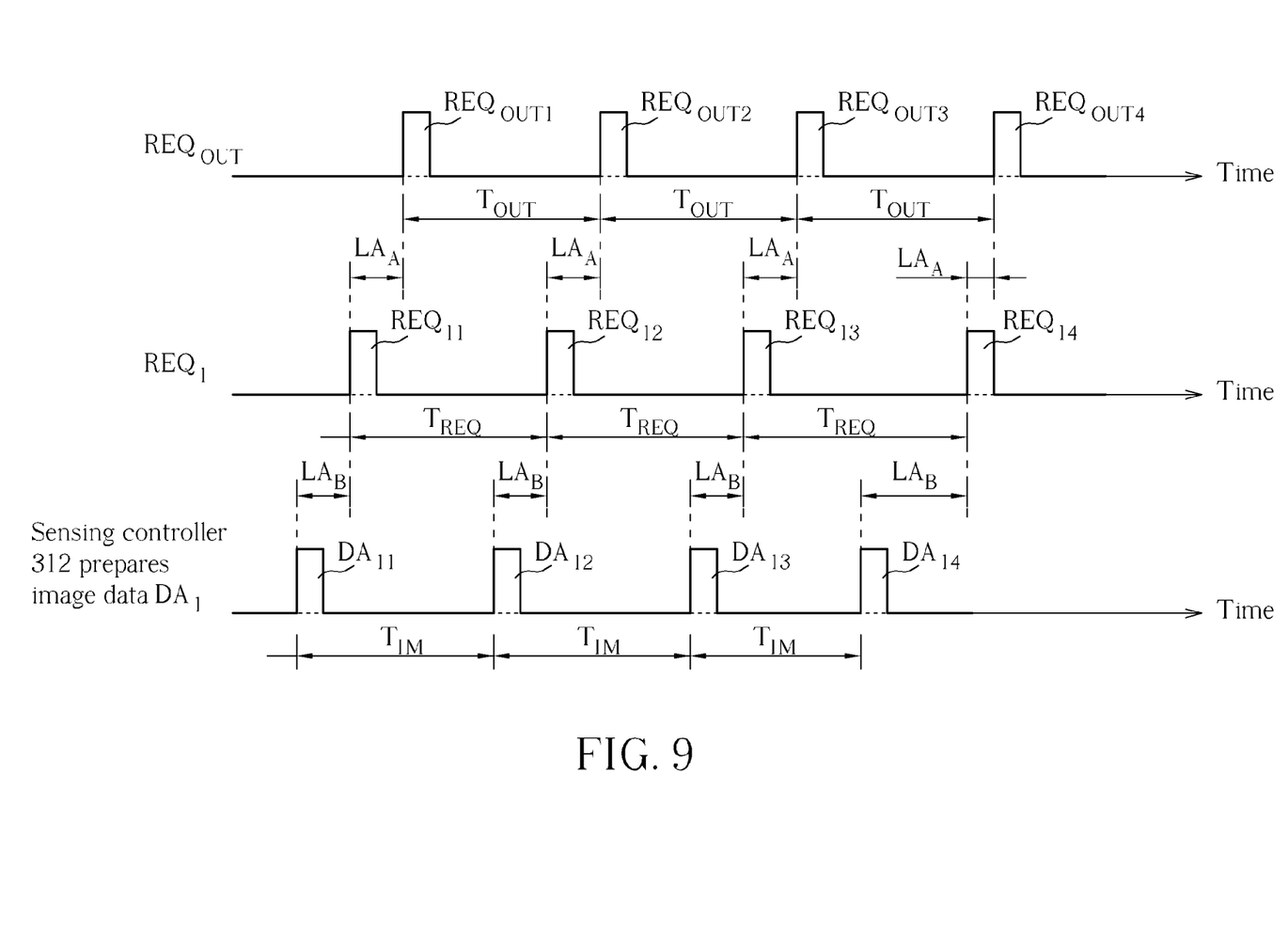
FIG. 9 is a diagram illustrating a method of reducing delay period.

Please refer to FIG. 9, which is a diagram illustrating a method of reducing delay period $LA_A$. To reduce delay period $LA_A$, controller 320 may adjust timing of controller 320 requesting image data $DA_1$ from sensing controller 320 according to timing of host 301 requesting output data $D_{OUT}$ from controller 320. For example, in FIG. 9, after controller 320 receives output data requests $REQ_{OUT1}$, $REQ_{OUT2}$ and $REQ_{OUT3}$, controller 320 may calculate length of output data request period $T_{OUT}$ according to time lapsed between host 301 sending out output data request $REQ_{OUT1}$ and $REQ_{OUT2}$ and time lapsed between controller 301 sending out output data requests $REQ_{OUT2}$ and $REQ_{OUT3}$, and calculate timing of host 301 sending out a future output data request, e.g. $REQ_{OUT4}$, according to length of image data request period $T_{REQ}$ and timing of host 301 sending out output data request $REQ_{OUT3}$. In this way, controller 320 may adjust timing of controller 320 generating image data request $REQ_1$ according to calculated timing of host 301 sending out future output data request $REQ_{OUT}$, so as to reduce delay period $LA_A$.

Figure 10:
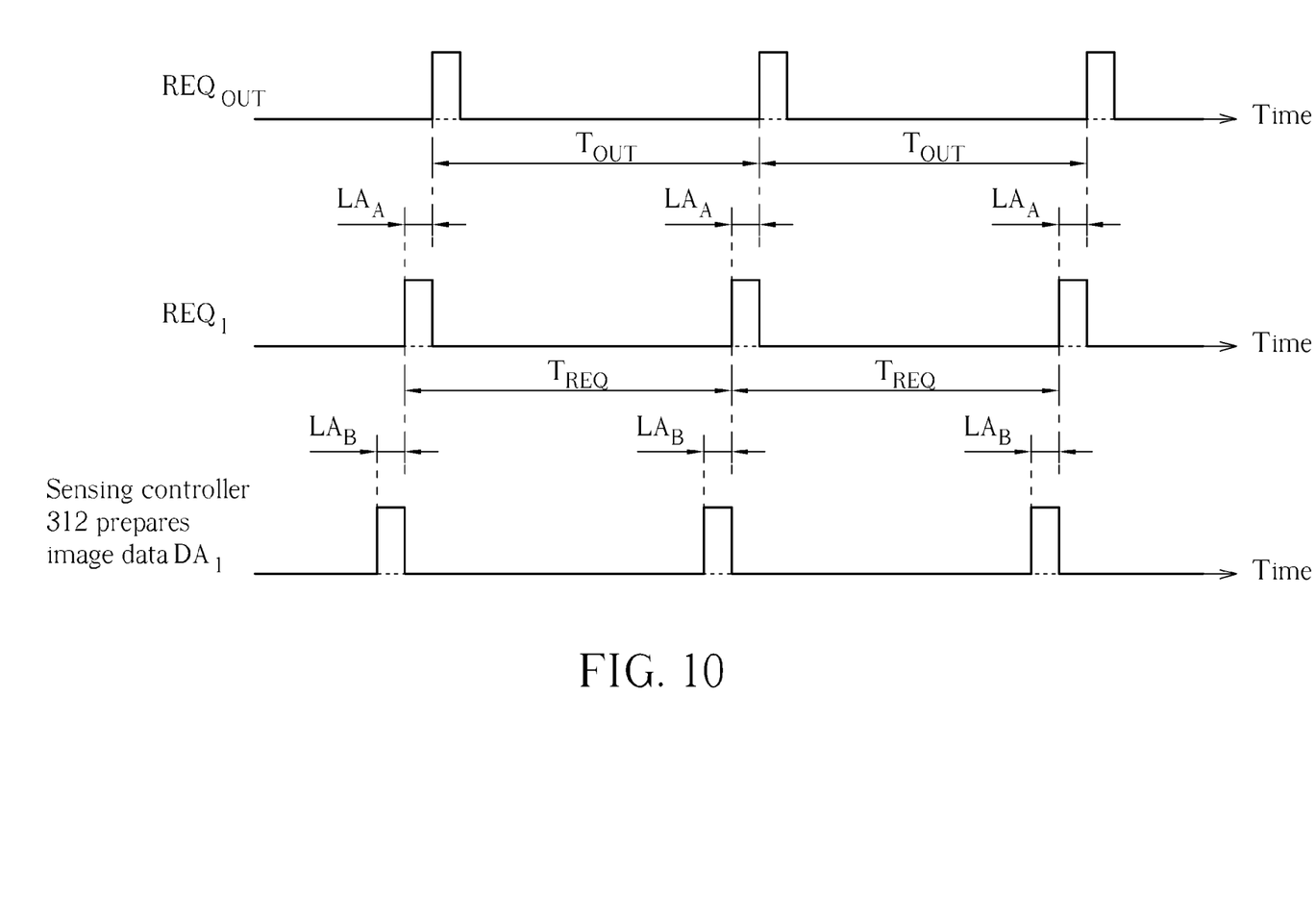
FIG. 10 is a diagram illustrating data transfer between sensing controller, controller and host after using the methods of reducing delay periods.

From the above, it can be seen that through the methods illustrated in FIG. 7 or FIG. 8, delay period $LA_B$ may be reduced, and through the method shown in FIG. 9, delay period $LA_A$ may be reduced. Please refer to FIG. 10, which is a diagram illustrating data transfer between sensing controller, controller and host after using the methods of reducing delay periods $LA_A$ and $LA_B$. In FIG. 10, it is assumed that controller 320 has already adjusted timing of controller 320 generating image data request $REQ_1$, so as to coordinate with timing of host 301 sending out future output data request $REQ_{OUT}$, and sensing controller 312 has already used the method illustrated in FIG. 7 or FIG. 8 to adjust timing of sensing controller 312 generating image data $DA_1$, so as to coordinate with timing of controller 320 generating image data request $REQ_1$. Thus, in FIG. 10, delay periods $LA_A$ and $LA_B$ may be reduced simultaneously to allow host 301 to obtain real time output data $DA_{OUT}$.

Figure 11:
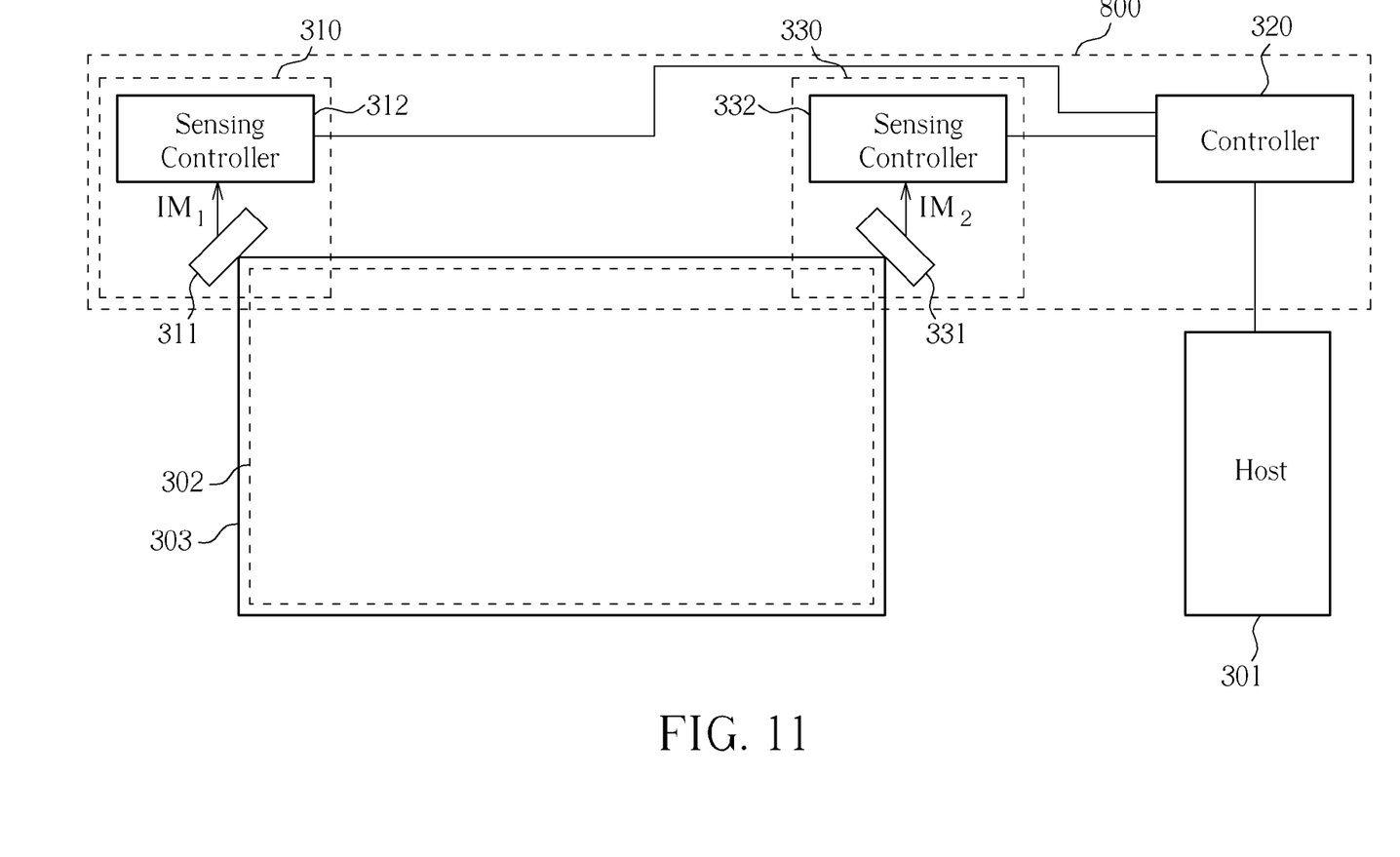
FIG. 11 and FIG. 12 are diagrams illustrating optical signal processing device according to an embodiment.
Figure 12:
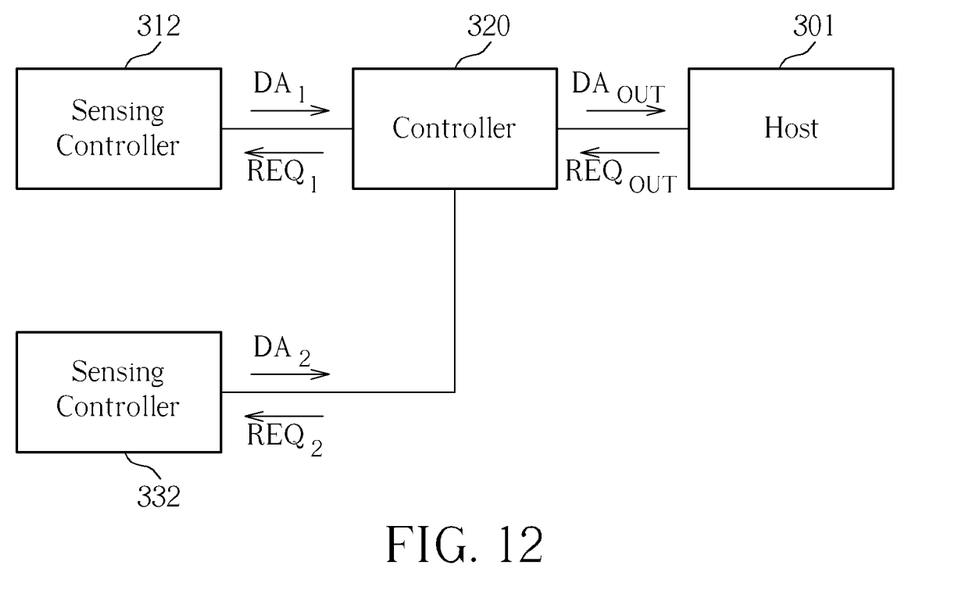

Please refer to FIG. 11 and FIG. 12. FIG. 11 and FIG. 12 are diagrams illustrating optical signal processing device 800 according to an embodiment. Compared to optical signal processing device 300, optical signal processing device 800 further comprises image sensing module 330. Image sensing module 330 comprises image sensor 331 and sensing controller 332. Image sensor 331 detects light to generate sense image $IM_2$. Sensing controller 332 receives sense image $IM_2$, and generates image data $DA_2$, where image data $DA_2$ comprises an object, e.g. user's finger(s), in image data of sense image $IM_2$. Controller 320 may obtain object location according to image data $DA_1$ and image data $DA_2$, and generate output data $DA_{OUT}$ comprising coordinates information of the object based thereupon. Controller 320 sends out image data request $REQ_2$ to sensing controller 332 every image data request period $T_{REQ}$, so as to receive image data $DA_2$. Similar to image sensing module 310, in image sensing module 330, sensing controller 332 may utilize the method illustrated in FIG. 7 or FIG. 8 to adjust timing of sensing controller 332 generating image data $DA_2$ to coordinate with timing of controller 320 generating image data request $REQ_2$. In this way, host 301 obtains real time output data $DA_{OUT}$.

In the above embodiments, image sensing module comprises an image sensor and a sensing controller. The image sensor uses a first frequency to capture a sense image. The sensing controller determines whether the image sensor has detected an object according to the sense image. When the sensing controller determines that the image sensor has detected an object, the sensing controller controls the image sensor to switch over to a second frequency to capture the sense image. By setting the first frequency to be higher than the second frequency, power consumption of the image sensing module may be reduced. Additionally, an optical signal processing device is described above. The optical signal processing device comprises an image sensing module and a controller. The image sensing module comprises an image sensor and a sensing controller. The image sensor senses light to generate a sense image. The sensing controller is used for receiving the sense image and generating image data. The controller generates output data for a host according to the image data, and the host requests the output data from the controller each output data request period. By adjusting timing of the controller requesting the image data from the sensing controller to coordinate with timing of the host requesting the output data from the controller, and adjusting timing of the sensing controller generating the image data to coordinate with timing of the controller requesting the image data from the sensing controller, the output data received by the host is real time information. This means that the host using the optical signal processing device disclosed can obtain real time output data, which increases responsiveness.

Those skilled in the art will readily observe that numerous modifications and alterations of the device and method may be made while retaining the teachings of the invention.

What is claimed is:

1. An image sensing module comprising:
a first image sensor having a first scanning mode and a second scanning mode;
wherein when the first image sensor operates in the first scanning mode, the first image sensor uses a first frequency to capture a first sense image;
wherein when the first image sensor operates in the second scanning mode, the first image sensor using a second frequency different than the first frequency to capture the first sense image; and
a first sensing controller for determining whether the first image sensor detects an object according to the first sense image;
wherein when the first sensing controller determines that the first image sensor has not detected an object, the first sensing controller controls the first image sensor to operate in the first scanning mode, and when the first sensing controller determines that the first image sensor has detected the object, the first sensing controller controls the first image sensor to operate in the second scanning mode.

2. The image sensing module of claim 1, wherein the first frequency is higher than the second frequency.

3. The image sensing module of claim 1, wherein when the first image sensor operates in the second scanning mode, in an idle period, the first image sensor does not capture the first sense image, and in a detection period, the first image sensor captures the first sense image.

4. An optical signal processing device, comprising:
a first image sensing module, comprising:
a first image sensor for sensing light to generate a first sense image; and
a first sensing controller for receiving the first sense image and generating first image data;
a first sensing controller configured to control the first image sensing module to operate at a first frequency when determined that the first image sensor has not detected an object and to control the first image sensing module to operate at a second frequency slower than the first frequency when determined that the first image sensor has detected the object; and
a controller for generating output data according to the first image data to provide to a host, wherein the host requesting the output data from the controller every output data request period;
wherein the controller generates an adjustment signal according to timing of the host requesting the output data from the controller;
wherein the first sensing controller receives the adjustment signal to adjust timing of the first sensing controller generating the first image data.

5. The optical signal processing device of claim 4, wherein the controller adjusts timing of the controller requesting the first image data from the first sensing controller according to timing of the host requesting the output data from the controller.

6. The optical signal processing device of claim 4, wherein the first image data comprises at least one object in image data of the first sense image, and the output data comprises coordinates information of the at least one object.

7. The optical signal processing device of claim 4, further comprising:
a second image sensing module comprising:
a second image sensor for sensing light to generate a second sense image; and
a second sensing controller for receiving the second sense image and generating second image data every image data generation period;
wherein the first image data comprises at least one object in image data of the first sense image, and the second image data comprises the at least one object in image data of the second sense image;
wherein the controller generates the output data according to the first image data and the second image data, and the output data comprises coordinates information of the at least one object;
wherein the second sensing controller adjusts timing of the second sensing controller generating the second image data according to the adjustment signal.

8. The optical signal processing device of claim 4, wherein the host is a personal computer or an on-screen display (OSD) controller.

9. The optical signal processing device of claim 4, wherein the optical signal processing device is an optical touch device, an optical distance measuring device, or an optical image capture device.

10. An optical signal processing device, comprising:
a first image sensing module, comprising:
a first image sensor, for sensing light to generate a first sense image; and
a first sensing controller, for receiving the first sense image and generating first image data;
a first sensing controller configured to control the first image sensing module to operate at a first frequency when determined that the first image sensor has not detected an object and to control the first image sensing module to operate at a second frequency slower than the first frequency when determined that the first image sensor has detected the object; and
a controller, the controller requesting the first image data from the first sensing controller every image data request period, the controller generating output data according to the first image data to provide to a host, and the host requesting the output data from the controller every output data request period;
wherein the first sensing controller adjusts timing of the first sensing controller generating the first image data according to timing of the controller requesting the first image data from the first sensing controller.

11. The optical signal processing device of claim 10, wherein the controller adjusts timing of the controller requesting the first image data from the first sensing controller according to timing of the host requesting the output data from the controller.

12. The optical signal processing device of claim 10, wherein the first image data comprises at least one object in image data of the first sense image, and the output data comprises coordinates information of the at least one object.

13. The optical signal processing device of claim 10, further comprising:
   a second image sensing module, comprising:
      a second image sensor, for sensing light to generate a second sense image; and
      a second sensing controller, for receiving the second sense image and generating second image data every image data generation period;
   wherein the controller every image data request period requests the second image data from the second sensing controller;
   wherein the first image data comprises at least one object in image data of the first sense image, and the second image data comprises the at least one object in image data of the second sense image;
   wherein the controller generates the output data according to the first image data and the second image data, and the output data comprises coordinates information of the at least one object.

14. The optical signal processing device of claim 10, wherein the host is a personal computer or an on-screen display (OSD) controller.

15. The optical signal processing device of claim 10, wherein the optical signal processing device is an optical touch device, an optical distance measuring device, or an optical image capture device.

16. An optical signal processing device comprising:
   a first image sensing module, comprising:
      a first image sensor, for sensing light to generate generates a first sense image; and
      a first sensing controller, for receiving the first sense image and generating first image data;
   a first sensing controller configured to control the first image sensing module to operate at a first frequency when determined that the first image sensor has not detected an object and to control the first image sensing module to operate at a second frequency slower than the first frequency when determined that the first image sensor has detected the object; and
   a controller, the controller requesting the first image data from the first sensing controller every image data request period, and the controller generating output data according to the first image data to provide to a host, the host requesting the output data from the controller every output data request period;
   wherein the controller adjusts timing of the controller requesting the first image data from the first sensing controller according to timing of the host requesting the output data from the controller.

17. The optical signal processing device of claim 16, wherein the first sensing controller adjusts timing of the first sensing controller generating the first image data according to timing of the controller requesting the first image data from the first sensing controller.

18. The optical signal processing device of claim 16, wherein the controller generates an adjustment signal according to timing of the host requesting the output data from the controller;
   wherein the first sensing controller receives the adjustment signal for adjusting timing of the first sensing controller generating the first image data.

19. The optical signal processing device of claim 16, wherein the first image data comprises at least one object in image data of the first sense image, and the output data comprises coordinates information of the at least one object.

20. The optical signal processing device of claim 16, further comprising:
   a second image sensing module, comprising:
      a second image sensor for sensing light to generate a second sense image; and
      a second sensing controller, for receiving the second sense image and generating second image data every image data generation period;
   wherein the controller requests the second image data from the second sensing controller every image data request period;
   wherein the first image data comprises at least one object in image data of the first sense image, and the second image data comprises the at least one object in image data of the second sense image;
   wherein the controller generates the output data according to the first image data and the second image data, and the output data comprises coordinates information of the at least one object.

21. The optical signal processing device of claim 16, wherein the host is a personal computer or an on-screen display (OSD) controller.

22. The optical signal processing device of claim 16, wherein the optical signal processing device is an optical touch device, an optical distance measuring device, or an optical image capture device.

* * * * *